United States Patent [19]

Fischetti

[11] Patent Number: 4,568,577

[45] Date of Patent: Feb. 4, 1986

[54] LAMINATED TIMBER STRUCTURE FOR USE AS A STUD, JOIST OR POST SUBSTITUTE

[76] Inventor: David C. Fischetti, 903 W. Maynard Rd., Cary, N.C. 27511

[21] Appl. No.: 336,518

[22] Filed: Jan. 4, 1982

[51] Int. Cl.$^4$ ............................................. B32B 21/00
[52] U.S. Cl. ...................................... 428/33; 156/258; 428/53; 428/54; 428/60; 428/188; 428/332; 428/537.1
[58] Field of Search ....................... 428/53, 54, 60, 44, 428/535, 33, 332, 188, 537.1; 156/63, 258, 264; 144/314 B, 322

[56] References Cited

U.S. PATENT DOCUMENTS

| | | | |
|---|---|---|---|
| 2,263,930 | 11/1941 | Pasquier | 428/53 |
| 2,396,438 | 3/1946 | Schaffer et al. | 428/188 |
| 3,969,558 | 7/1976 | Sadashige | 156/264 |
| 4,326,669 | 4/1982 | Moult et al. | 428/535 |

Primary Examiner—Paul J. Thibodeau
Attorney, Agent, or Firm—Mills and Coats

[57] ABSTRACT

The present invention entails a laminated timber structure comprised of a plurality of elongated laminated timbers laminated together in side-by-side relationship to form an elongated timber structure. The cross sectional area of the respective elongated timbers are of a generally uniform shape and size, with the cross sectional area being preferably square such as one-half inch by one-half inch. This enables standard size laminated timbers such as two by four, two by six, four by four, to be formed. In forming the laminated timber structure of the present invention, the respective elongated timbers are disposed in side-by-side relationship and glued along the sides of the timber as well as across the ends, giving rise to both edge and face joints. Moreover, at selected areas in the cross sectional area of the laminated timber structure of the present invention, there can be provided elongated voided areas formed by gluing a plurality of the timbers together in a surrounding configuration so as to define the elongated voided area internally within the surrounding timbers.

4 Claims, 2 Drawing Figures

LAMINATED TIMBER STRUCTURE FOR USE AS A STUD, JOIST OR POST SUBSTITUTE

FIELD OF INVENTION

The present invention relates to static structures and more particularly to laminated timber structures, especially laminated timber structures that include both edge and face joints and which serve as a substitute for a stud, joist, beam or post.

BACKGROUND OF INVENTION

Laminated wood beams and structures are commercially available today. Commonly such laminated wood structures include a plurality of standard timbers, such as two by four's, two by six's, two by eight's, two by ten's, etc., face laminated together to form laminated members which can be used as beams, girders, columns and other heavy timber structures.

It is common practice to vary the quality or grade of lumber within the laminated structure to locate higher strength wood in areas of higher stress. It is also common practice to camber laminated timber members to off-set dead load deflection. Pressure treatment of individual laminations prior to gluing is commonly practiced to provide resistance to decay.

Veneer laminated dimension lumber substitutes are also commercially available today. Commonly such laminated wood structures include a plurality of veneer type laminations of about one-eighth inch in thickness, all face glued. It is common practice to utilize the same quality or grade of timber throughout the entire laminated structure, irrespective of the location or placement of stress or load.

But from an application and economy perspective, conventional veneer laminated timber structures commercially available today have drawbacks. In this regard, it is common practice to utilize the same quality or grade of timber throughout the entire laminated structure, irrespective of the location or placement of stress and load. The net result of this is that the laminated timber structure is often over designed in certain areas of the structure because the same includes high grade timbers in areas where such is not needed. This results in the laminated timber structure being more expensive than called for, and consequently, often makes such cost prohibitive.

SUMMARY AND OBJECTS OF INVENTION

The present invention entails a laminated wood structure that is designed to overcome the disadvantages and shortcomings of laminated wood structures of the prior art. In particularly, the laminated wood structure of the present invention comprises a plurality of laminated timbers that include both edge and face glued joints, with each timber being of a generally uniform size and shape in cross sectional areas. In a preferred design, the laminations are one-half inch by one-half inch and can be of random length. This enables the respective laminations to be easily and conveniently assembled together to form standard size laminated wood structures.

Because of the particular size of the lamination, the quality and grade of the chosen timber can be varied throughout the laminated timber structure in accordance with load, stress, etc. High grade and quality timber can be appropriately placed in areas that require such due to high stress and load, etc. Likewise, areas of the laminated timber structure where stress and load are relatively low, can comprise relatively low grade and quality timbers. For example, as a general rule, it is known and appreciated that often the areas about the neutral axis of the laminated timber structure does not meet the same high stress as often found outside of this neutral axis. Consequently, for a given laminated timber structure, it is appreciated that the entire structure can be formed by utilizing various grade and quality timber laminations which results in the total costs of the same being less than a conventional veneer laminated timber structure utilizing the same high grade and quality timber throughout.

In addition, because of the particular size of the laminations, it is relatively easy and convenient to form laminated joists and timbers structures of standard dressed lumber size. Such beams or laminated wood structures can be formed without being cost prohibitive because such can be made from standard size laminations.

It is, therefore, an object of the present invention to provide a laminated timber structure having various grade timber laminations therein wherein respective timber laminations can be distributed and placed in appropriate areas of the laminated timber structure according to stress.

A further object of the present invention resides in the provision of a laminated timber structure having a plurality of laminated timbers wherein natural growth effects such as knots, compression wood, wane, and checks can be easily and conveniently removed such that higher design values can be used for tension, compression, and bending.

Another object of the present invention resides in the provision of a laminated timber structure of the character referred to above that includes edge and face glued timber laminations.

Another object of the present invention resides in the provision of a laminated timber structure of the character referred to above wherein portions of the laminated timber structure can be cambered to off set a portion of the anticipated deflection of a loaded beam or joist that actually forms the laminated timber structure.

Still a further object of the present invention resides in the provision of a laminated timber structure having a plurality of timber laminations of the character referred to above wherein checking and other seasoning defects associated with large one-piece wood members can be minimized.

It is also an object of the present invention to provide a laminated timber structure of the character referred to above wherein the laminations are seasoned before manufacture and the cross section of the laminated timber structure is uniformly seasoned throughout.

A further object of the present invention resides in the provision of a laminated wood structure design that includes the opportunity and capability of designing such with a varying cross sectional area along its length in accordance with structural requirements of the particular structure being formed.

Another object of the present invention resides in the provision of a laminated timber structure of the character referred to above wherein length and size not readily available from framing lumber can be easily and conveniently fabricated.

Also it is an object of the present invention to provide a laminated timber structure of the character referred to hereinabove wherein the quantity of adhesive required for edge and face joints is minimized when compared with conventional laminated-veneer members.

Another object of the present invention resides in the provision of a laminated timber structure having a plurality of generally uniformly sized and shaped laminations wherein the respective laminations are one-half inch by one-half inch so as to be a multiple of most standard dressed lumber sizes.

It is also an object of the present invention to provide a timber structure of the character referred to hereinabove where the same includes both edge and end or face joints wherein the end joints are of a pencil type joint.

Also it is an object of the present invention to provide a laminated wood structure that serves as a stud, joist or post substitute wherein the quantity of wood required for a joist application is minimized.

Still a further object of the present invention resides in the provision of a laminated wood structure wherein the total weight of the laminated wood structure is less than for a solid sawn lumber.

Other objects and advantages of the present invention will become apparent from a study of the following description and the accompanying drawings which are merely illustrative of the present invention.

LAMINATED TIMBER STRUCTURE

Figure 2:
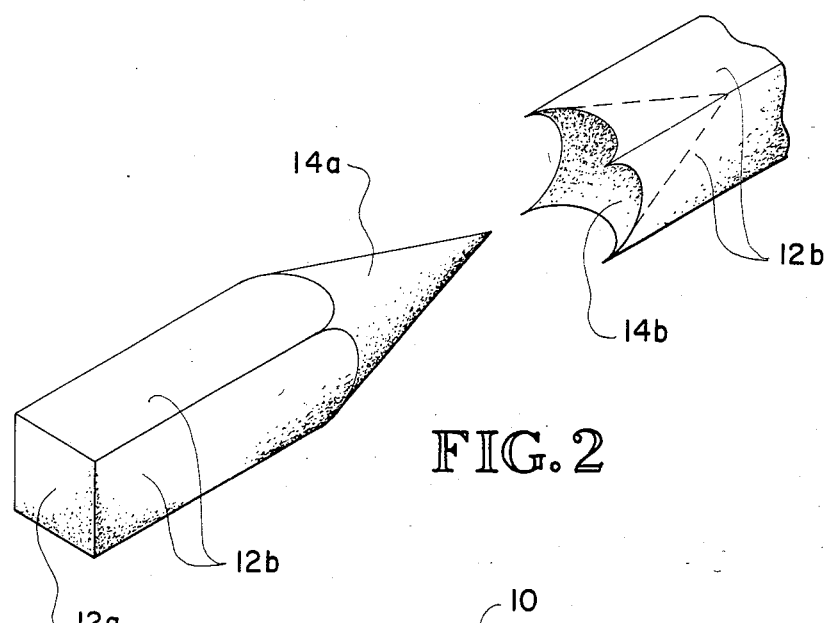
FIG. 2 is a fragmentary perspective view of two end portions of two respective lamination timbers illustrating a pencil point scarf joint.

With further reference to the drawings, the laminated timber structure of the present invention is shown therein and indicated generally by the numeral 10.

Laminated timber structure 10 includes a plurality of timber laminations 12 secured together in side-by-side relationship. Timber laminations 12 are elongated and extend in generally parallel relationship to a neutral axis 18 of the laminated timber structure 10.

In a preferred embodiment, timber laminations 12 are of a generally uniform shape and size in cross sectional area. Preferably, the timber laminations 12 would be square in cross section such as one-half inch by one-half inch. As will be discussed subsequently herein, by being one-half inch by one-half inch, the respective timber laminations 12 are multiples of standard timber sizes such as two by four, two by six, four by four, etc.

As illustrated in the drawings, the timber laminations 12 include four flat sides 12b and certain laminations 12 include a flat end 12a that serves to define the flat end of the formed laminated timber structure 10.

The laminated timber structure 10 of the present invention includes both edge and face joints where the respective timbers 12 are glued. In the case of a preferred embodiment, it is seen that the laminated timber structure 10 includes a plurality of timber laminations 12 glued in end to end relationship. To form the joint about the respective ends, which are referred to as face joints, in a contemplated design there is provided a pencil point scarf joint 14. To form this pencil point scarf joint, a respective end portion of certain timber laminations 12 is provided with a pencil point end 14a, as viewed in FIG. 2. To receive the pencil point end 14a, other respective laminations 12 are provided with a conical cavity 14b also shown in FIG. 2 that is particularly formed to receive pencil point end 14a in a very tight and secure relationship. To form this face joint, conventional glue is interposed between the pencil point end 14a and the conical cavity 14b.

It is appreciated that for a laminated stud, joist or post substitute of the character being described herein, that in use the stress about certain cross sectional areas will vary depending on the location thereof and the application and orientation of the laminated timber structure. This means that certain areas of the laminated timber structure 10 will not be required to withstand stresses that other areas will require. This means that the laminated timber structure can be more economically designed by selectively placing high grade timber at selected locations while at the same time placing relatively lower grade timbers at other locations.

Also, this means that the cross sectional area of actual timber utilized in a laminated timber structure 10 can vary from area to area along said neutral axis 18 in accordance with stress and load. In this regard, it is seen that the laminated timber structure 10 of the present invention can include selective elongated voids 16. Consequently, it is appreciated that where the laminated timber structure 10 includes voids 16 that the effective cross sectional area of timber will vary compared to areas of the laminated timber structure 10 where there are no voids 16. It is appreciated that the area of the laminated timber structure 10 that includes the voids 16 will vary depending on the use and application of the laminated timber structure and the areas where stress and load may be concentrated.

Figure 1:
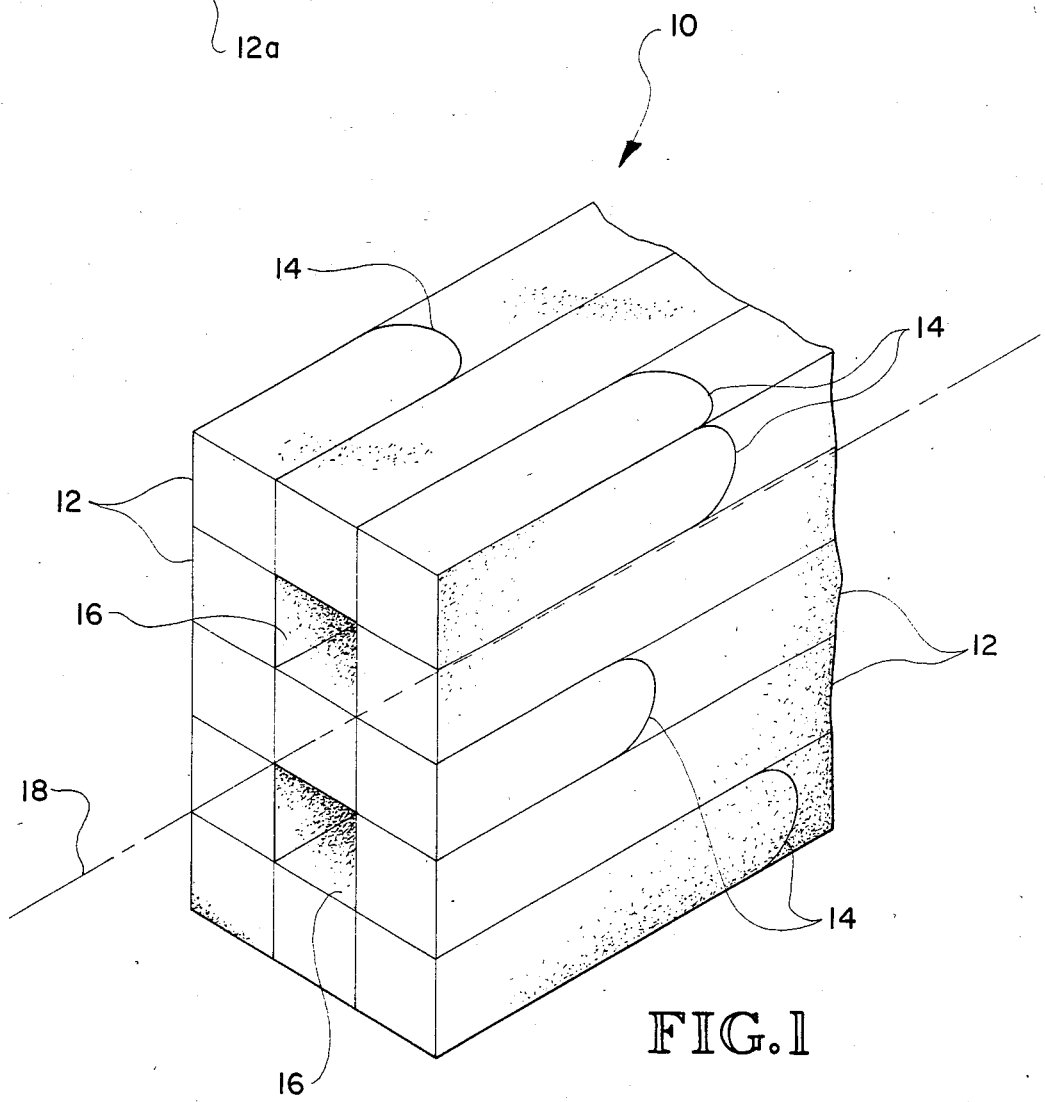
FIG. 1 is a fragmentary perspective view of a laminated timber structure constructed in accordance with the present invention.

In the design illustrated in FIG. 1, it is seen that the two elongated voids 16 generally flank the neutral axis 18 about the area illustrated and are formed by four surrounding elongated timber laminations 12. Although the particular area where such voids 16 can be plausibly located will vary according to size of beam structure and particular application along with the area where the stresses and load are applied, one will often find that the area about the neutral axis 18 of such a laminated timber structure will be exposed to less stress than areas found about the periphery of the laminated timber structure 10. It is appreciated that this enables one to design the laminated timber structure 10 with a varying cross section along its neutral axis in accordance with predetermined strength requirements.

By providing a laminated timber structure 10 such as discussed hereinabove, it is appreciated that higher grade timber can be placed in areas of higher stress. In addition, natural defects such as knots, wane, and checks can be removed from the respective timber laminations 12. This allows high design values to be used for tension, compression and bending.

Also checking and other seasoning defects associated with large one-piece wood timbers can be minimized. In the case of a laminated timber structure 10, the respective laminations 12 can be seasoned before manufacturing. In such a design, the final cross section of any edge and face glue joint substitute would be uniformly seasoned throughout.

In a contemplated design, as mentioned hereinabove, the laminated timber structure 10 of the present invention will comprise of a plurality of one-half inch by one-half inch square timber laminations 12. It is appreciated that the one-half inch by one-half inch dimension is a multiple of most standard dressed lumber sizes.

The following table illustrates standard size timber, along with the standard dress size and the laminated timber substitutes.

| NOMINAL DIMENSION | STANDARD LUMBER SIZES (DRESSED) (INCHES) | LAMINATED SUBSTITUTES (INCHES) |
| --- | --- | --- |
| 2 × 4 | 1½ × 3½ | 1½ × 3½ |
| 2 × 6 | 1½ × 5½ | 1½ × 5½ |
| 2 × 8 | 1½ × 7½ | 1½ × 7½ |
| 2 × 10 | 1½ × 9½ | 1½ × 9½ |
| 2 × 12 | 1½ × 11¼ | 1½ × 11½ |
| 3 × 6 | 2½ × 5½ | 2½ × 5½ |
| 3 × 8 | 2½ × 7½ | 2½ × 7½ |
| 3 × 10 | 2½ × 9½ | 2½ × 9½ |
| 3 × 12 | 2½ × 11¼ | 2½ × 11½ |
| 3 × 14 | 2½ × 13¼ | 2½ × 13½ |
| 4 × 4 | 3½ × 3½ | 3½ × 3½ |
| 4 × 6 | 3½ × 5½ | 3½ × 5½ |
| 4 × 8 | 3½ × 7½ | 3½ × 7½ |
| 4 × 10 | 3½ × 9½ | 3½ × 9½ |
| 4 × 12 | 3½ × 11¼ | 3½ × 11½ |

From the foregoing specification and description, it is appreciated that the laminated timber structure 10 of the present invention presents a practical and economical design for an edge and face glued laminated stud, joist or post substitute. It is particularly economical because the design enables various grade timbers to be incorporated into one single laminated timber structure with the respective timber grades being particularly disposed in areas in accordance with stress and load at these particular areas. In addition, the design of the laminated timber structure of the present invention lends itself to varying the effective cross sectional area of the actual timber utilized, with the cross sectional area varying in accordance with stress to be applied in such areas. Finally, the overall design enables one to virtually custom design individual portions or areas of the laminated timber structure such that the same will withstand applied loads and stress, but yet is not significantly over designed in areas where the stress and/or load is not as great.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An elongated laminated timber structure for use as a stud, joist, beam or post substitute, comprising: a plurality of elongated timbers extending in side-by-side relationship with each timber having a plurality of flat side edge and opposite ends with certain timbers joined edge to edge and certain timbers joined end to end to form the laminated timber structure, and wherein respective timbers comprising said laminated timber structure are of a generally uniform square cross sectional area; at least one elongated voided area formed in a portion of the cross sectional area of said laminated timber structure with said elongated voided area being defined by a plurality of surrounding elongated timbers and generally extending parallel to a major axis that extends centrally from end to end of said laminated timber structure; glue means interposed between respective side edges and ends of said timbers for gluing said timbers together to form said laminated timber structure having both edge and face joints defined therein; and a plurality of pencil face joints formed between respective ends of certain timbers and wherein respective pencil face joints are provided by forming a conically shaped end extension on certain timbers and a conically shaped cavity about the ends of other respective timbers such that said conically shaped end extensions can be inerted into said conically shaped cavities in order that a tight fitting and easily aligned pencil face joint can be created thereby.

2. The laminated timber structure of claim 1 wherein said elongated timbers are square in cross sectional area and wherein the respective widths of the square cross sectional area is a multiple of standard lumber sizes.

3. The laminated timber structure of claim 2 wherein said voided area is provided about said major axis of said laminated timber structure.

4. The laminated timber structure of claim 2 wherein said respective elongated timbers are one-half inch by one-half inch in cross sectional area.

* * * * *